United States Patent Office 3,812,103
Patented May 21, 1974

---

3,812,103
2,3-DIHYDRO-1,4-BENZODIAZEPINES
Werner Metlesics, Clifton, and Leo Henryk Sternbach, Upper Montclair, N.J., assignors to Hoffmann-La Roche Inc., Nutley, N.J.
No Drawing. Filed Apr. 11, 1967, Ser. No. 629,934
Int. Cl. C07d 53/06
U.S. Cl. 260—239.3 D    9 Claims

ABSTRACT OF THE DISCLOSURE 1,4-Benzodiazepines which are substituted in the 1-position with a carboxamide or thiocarboxamide radical and methods for their preparation. The 1,4-benzodiazepines which are substituted in the 1-position with a thiocarboxamide radical are useful as an anticonvulsant, whereas the 1,4-benzodiazepines which are substituted in the 1-position with a carboxamide radical are useful as muscle relaxants, psychosedatives, hypnotics, sedatives, anticonvulsants, and analgesics.

SUMMARY OF THE INVENTION

In accordance with this invention, it has been found that compounds of the formula:

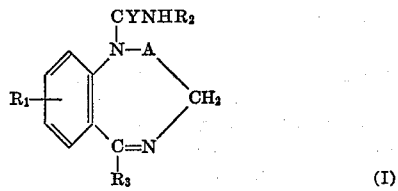

(I)

wherein Y is selected from the group consisting of oxygen and sulfur; A is selected from the group consisting of

and —CH$_2$—; R$_1$ is selected from the group consisting of hydrogen, halogen, lower alkyl, trifluoromethyl, and nitro; R$_2$ is selected from the group consisting of lower alkyl, phenyl or lower alkyl-substituted phenyl; and R$_3$ is selected from the group consisting of phenyl, pyridyl, halophenyl, and lower alkyl-substituted phenyl and their pharmaceutically acceptable salts are useful for pharmaceutical purposes.

When Y in Formula I above is sulfur, the compound of Formula I has the formula:

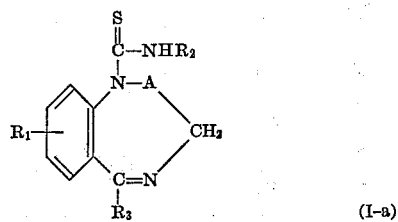

(I-a)

wherein R$_1$, R$_2$, R$_3$, and A are as above.

Compounds of Formula I-a and their pharmaceutically acceptable salts have been found to be useful as anticonvulsants. When Y is oxygen, the compounds of Formula I above have the formula:

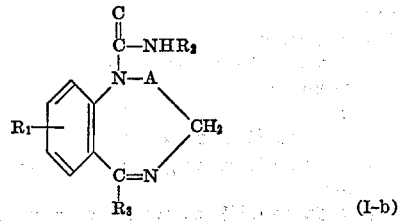

(I-b)

wherein R$_1$, R$_2$, R$_3$, and A are as above.

Compounds of Formula I-b and their pharmaceutically acceptable salts are useful as muscle relaxants, psychosedatives, sedatives, hypnotics, anticonvulsants, and analgesics.

Compounds of Formula I above are prepared from compounds of the formula:

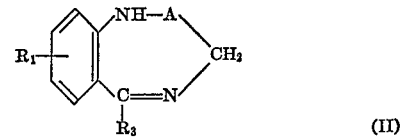

(II)

wherein A, R$_1$, and R$_3$ are as above by treating the compound of Formula II above with an isocyanate or isothiocyanate of the formula:

R$_2$—NCY    (III)

wherein R$_2$ and Y are as above.

DETAILED DESCRIPTION

The term "lower alkyl" includes both straight and branched chain groups having from 1 to 7 carbon atoms such as methyl, ethyl, propyl, isopropyl, and the like. The term "halogen" includes bromine, chlorine, fluorine and iodine. The preferred benzodiazepines of Formula I above are the 7-substituted benzodiazepines wherein R$_1$ in the 7-position is either a halogen, trifluoromethyl, or nitro. When R$_1$ is a halogen in the 7-position, the preferred halogens are chlorine or bromine.

In accordance with this invention, R$_3$ can be a phenyl radical, such as monofluorophenyl, monochlorophenyl, etc. Furthermore, R$_3$ can be a pyridyl radical such as 2-pyridyl. When R$_3$ is a phenyl radical, the preferred radical is phenyl, orthochlorophenyl or orthofluorophenyl. When R$_3$ is a pyridyl radical, the preferred radical is 2-pyridyl.

The compounds of Formula I above form pharmaceutically acceptable acid addition salts with both inorganic and organic pharmaceutically acceptable acids, such as hydrochloric acid, hydrobromic acid, sulfuric acid, phosphoric acid, citric acid, acetic acid, succinic acid, oleic acid, maleic acid, methanesulfonc acid, paratoluenesulfonic acid, and the like. Such acid addition salts are also within the scope of this invention.

As pointed out hereinbefore, compounds of Formula I-a are useful as anticonvulsants whereas the compounds of Formula I-b are useful as analgesics, sedatives, hypnotics, psychosedatives, anticonvulsants, and muscle relaxants. Both the compounds of Formulae I-a and I-b, as well as their pharmaceutically acceptable acid addition salts, are used in the form of conventional pharmaceutical preparations which contain said compounds in connection with conventional pharmaceutical organic or inorganic carrier materials suitable for internal administration. The pharmaceutical compositions containing the compounds of Formulae I-a and I-b above, as well as their pharmaceutically acceptable acid addition salts, can be administered parenterally or orally. Dosages can be adjusted to individul requirements, for example, these compounds can be administered in dosages of from about 0.1 mg./kg. to about 10.0 mg./kg. per day. These dosages can be administered in single dosage form or in divided dosage forms. The pharmaceutical compositions can contain such conventional organic or inorganic inert carrier materials such as water, gelatin, lactose, starch, magnesium stearate, talc, vegetable oils, gums, polyalkylene glycols, Vaseline, or the like. The pharmaceutical preparations can be in conventional solid forms such as tablets, dragées, suppositories, capsules or in conventional liquid forms such as solutions, suspensions or emulsions. The pharmaceutical compositions can be submitted to conventional pharmaceutical expedients such as sterilization and/ or can contain conventional pharmaceutical additives such as preservatives, stabilizing agents, wetting agents, emulsifying agents, salts for adjusting the osmotic pressure, buffers, or the like. They can also contain other therapeutically useful materials.

The compounds of Formula I above can be prepared from the compounds of Formula II above by treating the compounds of Formula I above with the isocyanate or isothiocyanate of Formula III above. In carrying out this reaction, phenylisocyanate, phenyl isothiocyanate, as well as any lower alkyl-substituted phenylisocyanates, lower alkyl-substituted phenylisothiocyanates, lower alkylisocyanates, lower alkylisothiocyanates, can be utilized. Among these preferred isocyanates and isothiocyanates which can be utilized in accordance with this invention are included phenylisocyanate, methylisocyanate, methylisothiocyanate, ethylisocyanate, ethylisothiocyanate, propylisocyanate, propylisothiocyanate, tolueneisocyanate, etc. This reaction can be carried out with an inert organic solvent. On the other hand, this reaction can be carried out without utilizing any solvent. The isocyanate or isothiocyanate compound of Formula III above can also be used as the solvent medium. If a solvent is desired, any inert organic solvent can be utilized in accordance with this invention. Among the preferred organic solvents that can be utilized in accordance with this invention are included benzene, carbon tetrachloride, dichloromethane, chloroform, toluene, chlorobenzene, etc. In carrying out this reaction, temperature and pressure are not critical and this reaction can be effected at room temperature and at atmospheric pressure or at elevated temperature and/or reduced pressure.

The following examples are illustrative but not limitative of the present invention. All temperatures in the examples are in degrees centigrade. The ether utilized in the examples is diethyl ether.

EXAMPLE 1

7-chloro-1,3-dihydro-N-methyl-5-phenyl-2H-1,4-benzodiazepine-1-carboxamide

A solution of 2.5 g. (0.01 mole) of 7-chloro-1,3-dihydro-5-phenyl - 2H - 1,4 - benzodiazepine and 4 ml. of methylisocyanate in 40 ml. of benzene was heated to reflux for 6 hours and kept at room temperature for 16 hours. A crystalline precipitate was collected on a filter. This precipitate was recrystallized from a mixture of methylene chloride and ether to give 7-chloro-1,3-dihydro-N-methyl-5-phenyl-2H,1,4-benzodiazepine - 1 - carboxamide (M.P.=180°–182°).

EXAMPLE 2

N-butyl-7-chloro1,3-dihydro-5-phenyl-2H-1,4-benzodiazepine-1-carboxamide

A solution of 9 g. (0.035 mole) of 7-chloro-1,3-dihydro - 5 - phenyl - 2H - 1,4 - benzodiazepine and 6 ml. of n-butylisocyanate in 100 ml. of benzene was heated to reflux for 16 hours. The solution was concentrated and on addition of ether gave a yellow solid which was collected on a filter. Recrystallization from acetone gave N-butyl - 7 - chloro-1,3-dihydro-5-phenyl-2H-1,4-benzodiazepine - 1 - carboxamide as white needles (M.P.=156°–158°).

EXAMPLE 3

7-chloro-1,3-dihydro-N-methyl-5-phenyl-2H-1,4-benzodiazepin-1-thiocarboxamide

A solution of 15 g. (0.058 mole) of 7-chloro-1,3-dihydro-5-phenyl-2H-1,4-benzodiazepine and 12 g. (0.16 mole) of methylisothiocyanate in 200 ml. of benzene was heated to reflux for 6 hours and kept at room temperature for 16 hours. The solution was concentrated and on addition of ethanol gave white prisms. Recrystallization from a mixture of methylene chloride and petroleum ether gave 7-chloro-1,3-dihydro-N-methyl-5-phenyl-2H-1,4-benzodiazepin-1-thiocarboxamide (M.P.=179°–181°).

EXAMPLE 4

7-chloro-1,3-dihydro-N-methyl-2-oxo-5-phenyl-2H-1,4-benzodiazepin-1-carboxamide

A solution of 12 g. (0.044 mole) of 7-chloro-1,3-dihydro-5-phenyl-2H-1,4-benzodiazepin-2-one and 25 ml. of methylisocyanate in 100 ml. of benzene was heated to reflux for 16 hours. The solution was concentrated and gave white prisms. Recrystallization from a mixture of methylene chloride and petroleum ether yielded 7-chloro-1,3-dihydro-N-methyl-2-oxo-5-phenyl-2H-1,4-benzodiazepin - 1 - carboxamide (M.P.=157°–159°).

EXAMPLE 5

7-chloro-1,3-dihydro-2-oxo-5-phenyl-2H-1,4-benzodiazepin-1-carboxanilide

A solution of 5 g. (0.018 mole) of 7-chloro-1,3-dihydro-5-phenyl-2H-1,4-benzodiazepin-2-one and 20 ml. of phenylisocyanate in 50 ml. of benzene was heated to reflux for 16 hours. Crystals precipitated which after recrystallization from a mixture of methylene chloride and petroleum ether gave white needles of 7-chloro-1,3-dihydro-2-oxo-5-phenyl-2H-1,4 - benzodiazepin - 1 - carboxanilide (M.P.=209°–212°).

EXAMPLE 6

A suppository was formed containing the following ingredients:

| Ingredient: | Per 1.3-gm. suppository |
|---|---|
| 7-Chloro-1,3-dihydro-N-methyl-5-phenyl - 2H-1,4-benzodiazepine-1-carboxamide gm | 0.010 |
| Wecobee M [1] gm | 1.245 |
| Carnauba wax gm | 0.045 |

[1] Cocoa butter—coconut derivative having a melting point of 96° to 98° F., sold by E. F. Drew Co., New York, N.Y.

The procedure employed in preparing the 1.3-gram suppository was as follows:

The Wecobee M and the carnauba wax were melted in a suitable size glass lined container (stainless steel may also be used), mixed well and cooled to 45° C. The 7-chloro-1,3-dihydro-N-methyl-5-phenyl-2H-1,4-benzodiazepine-1-carboxamide, which had been reduced to a fine powder with no lumps, was added and stirred until completely and uniformly dispersed. The mixture was poured into suppository molds to yield suppositories having an individual weight of 1.3 gms. The suppositories were cooled and removed from molds. They were then individually wrapped in wax paper for packaging.

EXAMPLE 7

A suppository was formed in the same manner as Example 6 except that the active ingredient was 7-chloro-1,3-dihydro-2-oxo-5-phenyl-2H-1,4-benzodiazepin-1-carboxanilide.

EXAMPLE 8

A suppository was formed in the same manner as Example 6 except that the active ingredient was 7-chloro-1,3-dihydro-N-methyl-5-phenyl-2H-1,4-benzodiazepine-1-thiocarboxamide.

EXAMPLE 9

A suppository was formed in the same manner as Example 6 except that the active ingredient was N-butyl-7-chloro-1,3-dihydro-5-phenyl-2H-1,4-benzodiazepine-1-carboxamide.

EXAMPLE 10

A suppository was formed in the same manner as Example 6 except that the active ingredient was 7-chloro-1,3-dihydro-N-methyl-2-oxo-5-phenyl-2H-1,4 - benzodiazepin-1-carboxamide.

EXAMPLE 11

A 210 mg. capsule was formed containing the following ingredients:

| Ingredient: | Per capsule, mg. |
|---|---|
| 7-chloro-1,3-dihydro-N-methyl-5-phenyl-2H-1,4-benzodiazepine-1-carboxamide | 10 |
| Lactose, U.S.P. | 165 |
| Corn starch, U.S.P. | 30 |
| Talc, U.S.P. | 5 |
| Total weight | 210 |

The procedure employed for preparing the 210 mg. capsule was as follows:

7-Chloro-1,3-dihydro-N-methyl-5-phenyl-2H-1,4-benzodiazepine-1-carboxamide, lactose and corn starch were mixed in a mixer. The mixture was further blended by passing through a Fitzpatrick Comminuting Machine with a No. 1A screen with knives forward. The blended powder was returned to the mixer, the talc added and blended thoroughly. The mixture was filled into No. 4 hard shell gelatin capsules on a Parke Davis capsulating machine. (Any similar type capsulating machine may be used.)

EXAMPLE 12

A capsule was formed in the same manner as Example 11 except that the active ingredient was 7-chloro-1,3-dihydro-2-oxo-5-phenyl-2H - 1,4 - benzodiazepin-1-carboxanilide.

EXAMPLE 13

A capsule was formed in the same manner as Example 11 except that the active ingredient was 7-chloro-1,3-dihydro - N - methyl - 5 - phenyl-2H-1,4-benzodiazepine-1-thiocarboxamide.

EXAMPLE 14

A capsule was formed in the same manner as Example 11 except that the active ingredient was N-butyl-7-chloro-1,3 - dihydro - 5 - phenyl-2H-1,4-benzodiazepine-1-carboxamide.

EXAMPLE 15

A capsule was formed in the same manner as Example 11 except that the active ingredient was 7-chloro-1,3-dihydro - N - methyl - 2 - oxo-5-phenyl-2H-1,4-benzodiazepin-1-carboxamide.

EXAMPLE 16

A 10,000 cc. parenteral formulation was formed containing the following ingredients:

| Ingredient: | Per cc. |
|---|---|
| 7 - Chloro - 1,3 - dihydro - N - methyl - 5-phenyl - 2 H - 1,4 - benzodiazepine - 1-carboxamide mg. | 0.5 |
| Propylene glycol cc. | 0.4 |
| Benzyl alcohol (benzaldehyde free) cc. | 0.015 |
| Ethanol 95 percent USP cc. | 0.10 |
| Sodium benzoate mg. | 48.8 |
| Benzoic acid mg. | 1.2 |
| Water for injection, q.s. cc. | 1.0 |

The procedure employed in preparing the 10,000 cc. parenteral formulation was as follows:

The 5 gm. of 7-chloro-1,3-dihydro-N-methyl-5-phenyl-2H-1,4-benzodiazepine-1-carboxamide were dissolved in 150 cc. of benzyl alcohol; 4,000 cc. of propylene glycol and 1,000 cc. of ethanol were added. The 12 gm. of benzoic acid were dissolved in the above. The 488 gm. of sodium benzoate dissolved in 3,000 cc. of water for injection were added. The solution was brought up to final volume of 10,000 cc. with water for injection. The solution was filtered thru an 02 Selas candle, filled into suitable size ampuls, gassed with $N_2$ and sealed. It was then autoclaved at 10 p.s.i. for 30 minutes.

EXAMPLE 17

A parenteral formulation was formed in the same manner as Example 16 except that the active ingredient was 7 - chloro - 1,3 - dihydro - 2 - oxo - 5-phenyl-2H-1,4-benzodiazepin-1-carboxanilide.

EXAMPLE 18

A parenteral formulation was formed in the same manner as Example 16 except that the active ingredient was 7 - chloro - 1,3 - dihydro - N - methyl-5-phenyl-2H-1,4-benzodiazepine-1-thiocarboxamide.

EXAMPLE 19

A parenteral formulation was formed in the same manner as Example 16 except that the active ingredient was N - butyl - 7-chloro-1,3-dihydro-5-phenyl-2H-1,4-benzodiazepine-1-carboxamide.

EXAMPLE 20

A parenteral formulation was formed in the same manner as Example 16 except that the active ingredient was 7 - chloro - 1,3 - dihydro-N-methyl-2-oxo-5-phenyl-2H-1,4-benzodiazepin-1-carboxamide.

EXAMPLE 21

A 225 mg. tablet was formed containing the following ingredients:

| Ingredient: | Per tablet, mg. |
|---|---|
| 7 - Chloro - 1,3 - dihydro - N - methyl - 5-phenyl - 2H - 1,4 - benzodiazepine - 1-carboxamide | 25.00 |
| Dicalcium phosphate dihydrate, unmilled | 175.00 |
| Corn starch | 24.00 |
| Magnesium stearate | 1.00 |
| Total weight | 225.00 |

The procedure employed for preparing the 225 mg. tablet was as follows:

7 - Chloro - 1,3 - dihydro - N - methyl-5-phenyl-2H-1,4-benzodiazepine-1-carboxamide and corn starch were mixed together and passed through a No. 00 screen in Model "J" Fitz with hammers forward. This premix was then mixed with dicalcium phosphate and one-half of the magnesium stearate, passed through a No. 1A Screen in Model "J" Fitz with knives forward and slugged. The slugs were passed through a No. 2A plate in a Model "D" Fitz at slow speed with knives forward, and the remaining magnesium stearate was added. The mixture was mixed and compressed.

EXAMPLE 22

A tablet was formed in the same manner as Example 21 except that the active ingredient was 7-chloro-1,3-dihydro-2-oxo-5-phenyl - 2H - 1,4-benzodiazepin-1-carboxanilide.

EXAMPLE 23

A tablet was formed in the same manner as Example 21 except that the active ingredient was 7-chloro-1,3-dihydro - N - methyl - 5 - phenyl-2H-1,4-benzodiazepine-1-thiocarboxamide.

EXAMPLE 24

A tablet was formed in the same manner as Example 21 except that the active ingredient was N-butyl-7-chloro-1,3-dihydro - 5 - phenyl - 2H - 1,4-benzodiazepine-1-carboxamide.

EXAMPLE 25

A tablet was formed in the same manner as Example 21 except that the active ingredient was 7-chloro-1,3-dihydro - N - methyl - 2 - oxo-5-phenyl-H-1,4-benzodiazepin-1-carboxamide.

What is claimed is:

1. A compound selected from the group consisting of

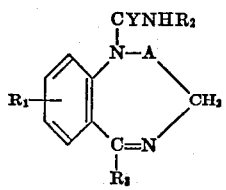

wherein Y is selected from the group consisting of oxygen and sulfur; A is selected from the group consisting of oxygen and sulfur; A is selected from the group consisting of

and —CH$_2$—; R$_1$ is selected from the group consisting of hydrogen, halogen, lower alkyl, trifluoromethyl, and nitro; R$_2$ is selected from the group consisting of lower alkyl, phenyl or lower alkyl-substituted phenyl; and R$_3$ is selected from the group consisting of phenyl, pyridyl, halophenyl and lower alkyl-substituted phenyl.

2. The compound of claim 1 wherein Y is sulfur.
3. The compound of claim 2 wherein said compound is 7-chloro-1,3-dihydro-N-methyl-5-phenyl-2H-1,4-benzodiazepin-1-thiocarboxamide.
4. The compound of claim 1 wherein Y is oxygen.
5. The compound of claim 4 wherein said compound is 7-chloro-1,3-dihydro-N-methyl-5-phenyl-2H-1,4-benzodiazepine-1-carboxamide.
6. The compound of claim 4 wherein said compound is N-butyl-7-chloro-1,3-dihydro-5-phenyl-2H-1,4-benzodiazepine-1-carboxamide.
7. The compound of claim 4 wherein said compound is 7-chloro-1,3-dihydro-N-methyl-2-oxo-5-phenyl-2H-1,4-benzodiazepin-1-carboxamide.
8. The compound of claim 4 wherein said compound is 7-chloro-1,3-dihydro-2-oxo-5-phenyl-2H-1,4-benzodiazepin-1-carboxanilide.
9. A compound of the formula:

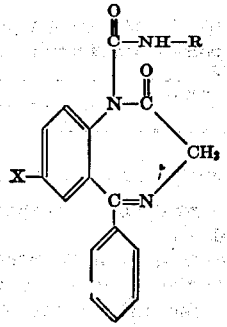

wherein R is selected from the group consisting of lower alkyl and phenyl and X is selected from the group consisting of hydrogen, halogen and nitro.

References Cited
UNITED STATES PATENTS 3,236,838  6/1963  Archer et al. _____ 260—239.3

OTHER REFERENCES

Burger Medicinal Chemistry, 2nd ed., pp. 77–78 (Interscience).

Naller, "Chemistry of Organic Compound," 2nd ed., pp. 317 and 326 (Saunders) (1957).

HENRY R. JILES, Primary Examiner

R. T. BOND, Assistant Examiner

U.S. Cl. X.R.

260—239 BD; 424—244, 263

UNITED STATES PATENT OFFICE
CERTIFICATE OF CORRECTION

Patent No. 3,812,103　　　　　　　　　Dated May 21, 1974

Inventor(s) Werner Metlesics & Leo Henryk Sternbach

It is certified that error appears in the above-identified patent and that said Letters Patent are hereby corrected as shown below:

Column 7, lines 11-12

"A is selected from the group consisting of
oxygen and sulfur,"

should be completely omitted

Signed and sealed this 5th day of November 1974.

(SEAL)
Attest:

McCOY M. GIBSON JR.　　　　　　　　C. MARSHALL DANN
Attesting Officer　　　　　　　　　　Commissioner of Patents